Feb. 28, 1956 — L. C. QUERCETTI ET AL — 2,736,360
TUBE FLARING PLIERS

Filed Nov. 5, 1954 — 2 Sheets-Sheet 1

INVENTORS
Louis C. Quercetti
Frank A. Palladino
Anthony J. Marino
By W. W. Williamson
ATTORNEY Feb. 28, 1956  L. C. QUERCETTI ET AL  2,736,360
TUBE FLARING PLIERS Filed Nov. 5, 1954  2 Sheets-Sheet 2

INVENTORS
Louis C. Quercetti
Frank A. Palladino
Anthony J. Marino
By W. W. Williamson
ATTORNEY

United States Patent Office 2,736,360
Patented Feb. 28, 1956

2,736,360

TUBE FLARING PLIERS

Louis C. Quercetti, Philadelphia, Frank A. Palladino, Pottstown, and Anthony J. Marino, Philadelphia, Pa.

Application November 5, 1954, Serial No. 467,126

5 Claims. (Cl. 153—79)

Our invention relates to new and useful tube flaring pliers which are relatively light in weight and capable of easy portable manipulation with all of the elements self contained thereby eliminating the necessity of providing a vise, wrench, hammer or other extraneous instrumentality in connection with the operations thereof.

The general purpose of the present invention is to provide a device for flaring tubing in confined or hard to reach locations as the final operation is accomplished by the mere squeezing of the tool handles with the use of one hand. The flaring operations can be carried out with a minimum of dismantling of machinery or other structures or parts to be repaired and while it is excellent for use in the repair fields it is just as useful in original installations and erection work of various classes.

An object of this invention is to construct the tube flaring pliers including a clamping and shaping die holder to which is connected a clutching handle for actuating the dies and said holder further provided with a bridge in which a spring actuated punch is reciprocatingly mounted to be operated by a cam shaped operating handle pivoted on a portion of said bridge.

Another object of the invention is to provide a plurality of pairs of clamping and shaping die members which are interchangeable for use with different sizes of tubes and which are replaceable in case of wear thereby eliminating the necessity of employing a number of tools to accommodate a wide range of sizes or discarding a complete tool when all of the parts, excepting the die members will remain in good working condition indefinitely.

Another object of the invention is to fashion the die holder element in a manner to provide interior opposed tracks and a die entrance whereby a pair of companion die members may be inserted in the holder, one at a time, and moved into engagement with said tracks and the second, following or inner die member having a T-slot socket for registration with a head on the inner end of the clutching handle having threaded connection with the die holder element and said die members having opposed laterally projecting flanges at each side to provide track ways whereby said die members are slidable along the tracks.

Another object of the invention is to provide companion die members having laterally projecting head flanges at both sides of one end and similar base flanges at the other end and which are longer and extend farther outwardly than said head flanges to position the die members relative to the tracks on the die holder as the head ends of the die members are inserted into the entrance.

Another object of this invention is to provide both die members of a pair with T-slot sockets whereby they may be mounted in the holder in any order.

A further object of the invention is to form the T-slot sockets the entire length from top to bottom of the die members to facilitate manufacture.

A still further object of this invention is to provide in tube flaring pliers, a conical punch having a stem slidably mounted on the bridge of the die holder, normally retracted by a spring and projected forwardly by a cam operating lever engaging a washer on the base of said punch.

With the above and other objects in view this invention consists of the details of construction and combination of elements hereinafter set forth and then designated by the claims.

In order that those skilled in the art to which this invention appertains may understand how to make and use the same we will describe its construction in detail referring by numerals to the accompanying drawings forming a part hereof, in which—

Figure 1:
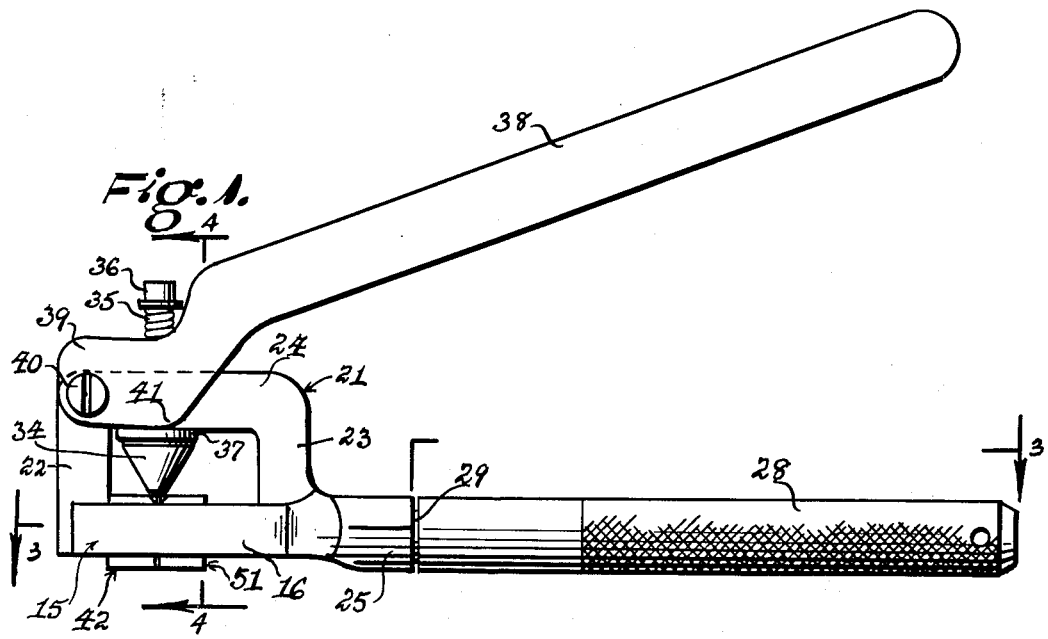
Fig. 1 is a side elevation of the tube flaring pliers constructed in accordance with our invention.

In carrying out our invention as herein embodied 15 represents the die holder in the general form of an oblong yoke to provide an opening or chamber between the parallel side rails 16 and outer and inner ends 17 and 18 respectively. The inner end of the chamber is wider than the balance thereof and constitutes an entrance 19 while the inner edges of the side rails 16 beyond or outwardly of said entrance form tracks 20 to slidably support die members. A bridge 21 is formed on the die holder above and longitudinally of the latter and said bridge includes legs 22, 23 rising from the ends of the die holder and a span or bar 24 extending lengthwise of and centrally of the chamber in said holder between the legs 22, 23.

Figure 3:
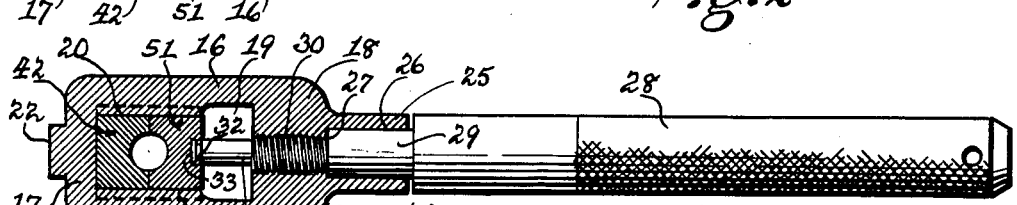
Fig. 3 is a view partly in section and partly in elevation taken on the line 3—3 of Fig. 1.
Figure 4:
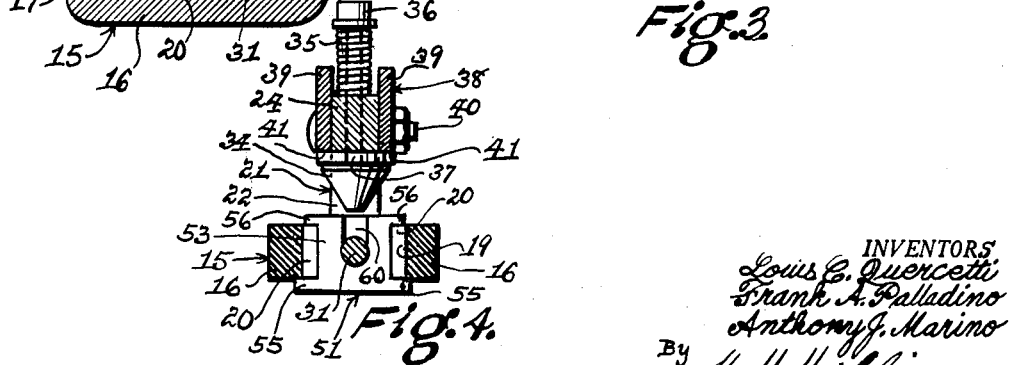
Fig. 4 is a vertical cross sectional view on the line 4—4 of Fig. 1.

The inner end 18 of the holder 15 has a shank 25 projecting therefrom with a bore 26 running through it and said end 18 of the holder to provide a communication between the exterior at the terminal of said shank and the chamber of the holder. Preferably the bore is of two different diameters with the smaller portion inwardly of the shank to form a shoulder 27 and said smaller portion of the bore is threaded as shown in Fig. 3.

A clutching handle 28, preferably, has a reduced journal 29 slidably and rotatably mounted in the plain larger portion of the bore 26, a further reduced threaded body 30 engaging the threaded portion of said bore 26, a still further reduced stem 31 which has a circumferential groove adjacent the inner terminal to form a reduced neck 32 and a head 33, said stem normally located within the inner portion of the die holder chamber.

Figure 2:
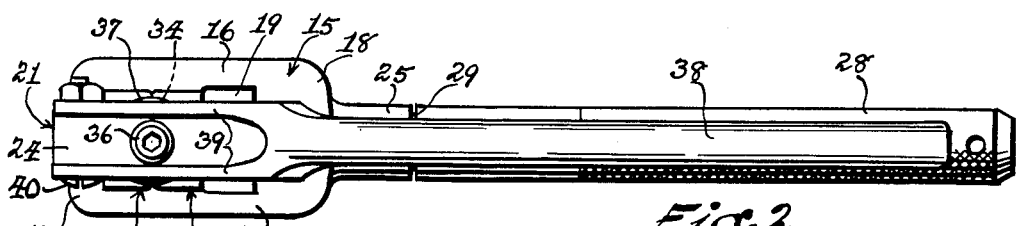
Fig. 2 is a top plan view of Fig. 1.

A conical punch 34 is slidably and rotatably mounted on the bridge span 24 substantially midway the length of and midway between the tracks 20 by means of its spindle projected through a hole in said bridge span with a coil spring 35 disposed about said spindle between the bridge span 24 and the head of a screw 36 threaded endwise into said punch spindle. The moving of the screw in or out will adjust the tension of the spring and for this purpose the head of the screw may have a socket therein as depicted in Fig. 2.

The conical punch 34 is located beneath the bridge span 24 or between it and the die holder with the base of said punch uppermost and, by preference, a washer 37 is superimposed on the base in surrounding relation to the punch spindle. An operating cam handle or lever 38 has a bifurcated end to form spaced parallel legs 39 disposed on opposite sides of the bridge 21 and pivotally attached thereto by an appropriate pivot 40 whereby said operating handle 38 may be moved to and fro relative to the clutching handle 28. The legs 39 of the operating handle 38 are fashioned to provide cam surfaces 41 which cooperate directly with the base of the conical punch or indirectly therewith through the medium of the washer 37 at opposite sides of the bridge to project said punch forwardly as the two handles are moved towards each other, said punch and operating handle 38 being retracted by the spring 35 when pressure on said operating handle is relieved.

The clamping and shaping dies each comprise two companion members, as herein referred to, or two halves as often described in the trades and they are made in a plurality of different sizes to accommodate a number of different sizes of tubes and are, therefore, interchangeable.

Figure 5:
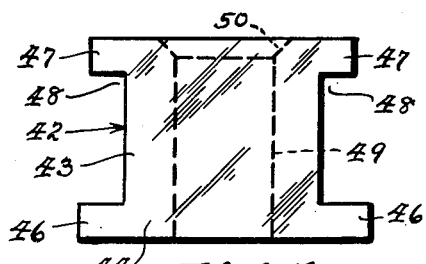
Fig. 5 is an enlarged outer face or back view of one type of clamping and forming die member which can be used only as the forward die element.
Figure 6:
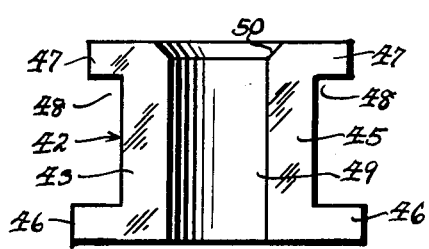
Fig. 6 is an inner face view thereof.
Figure 7:
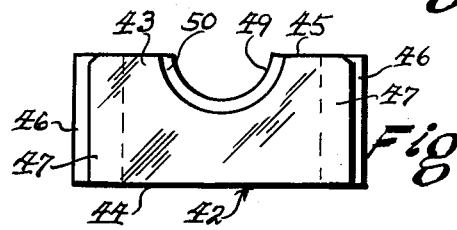
Fig. 7 is an upper or head end view of the same.

As illustrated in Figs. 5, 6 and 7 one die member 42 may comprise a rectangular body 43 including a back or outer face 44 and a front or inner face 45 with oppositely projecting base flanges 46 at one end and similar oppositely projecting head flanges 47 at the opposite end, the base and head flange on each side of the body being spaced apart and forming a track way 48 at each side of the body for registration with the tracks 20 on the die holder. The base and head flanges may be of equal length but, preferably, said base flanges are longer than the head flanges to limit the insertion movement of a die member into the entrance 19 of the holder 15 and thus properly align the die member for and prior to registration with the die holder tracks. The die member 42 has a recess or matrix 49 formed in the front or inner face 43 running completely from base to head which recess is flared outwardly at the upper or head end as indicated at 50. The recess and its flared end or complete matrix is slightly less than a semi-circle in cross section whereby when a pair of companion die members are moved into operative tube clamping relation a tight gripping action may be accomplished before said die members can contact each other.

Figure 8:
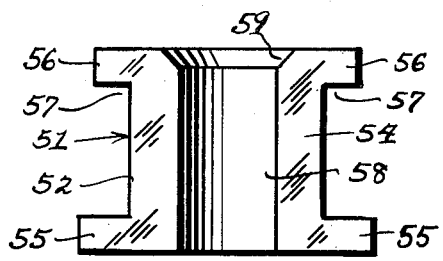
Fig. 8 is an inner face view of another die member which can be used as the rear die element in conjunction with one like that illustrated in Figs. 5–7 or two of these can be used together to form a complete clamping and forming die.
Figure 9:
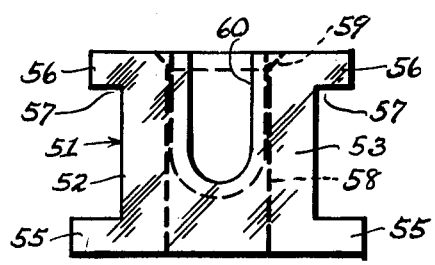
Fig. 9 is an outer face or back view thereof.
Figure 10:
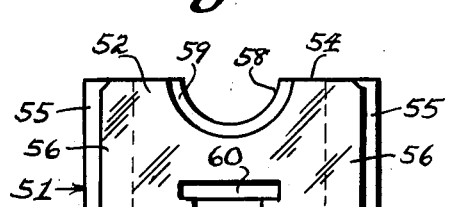
Fig. 10 is an upper or head end view of the same.

Another die member 51, Figs. 8, 9 and 10, also comprises a rectangular body 52 including a back or outer face 53 and a front or inner face 54 with oppositely projecting base flanges 55 at one end and similar oppositely projecting head flanges 56 at the other end, the base and head flange on each side of the body being spaced apart and forming a track way 57 at each side of the body for registration with the aforementioned tracks 20 on the die holder. Like the previously described die member said base and head flanges may be of equal length but also, preferably, the base flanges are longer than the head flanges for the purpose set forth above. The die member 51 has a recess or matrix 58 formed in the front or inner face running from base to head and is flared outwardly at the upper or head end as shown at 59. The complete matrix in this instance also is less than a semicircle in cross section so that the complementary matrices of companion die members will assure a firm grip on a tube clamped between such die members. The die member 51 has a T-slot socket 60 formed in the back face 53, Figs. 9 and 10, which for purposes of illustration is shown as running only part of the length of the die member body from the head end thereof towards the base end but terminating short of the latter so that said socket is open at the top and closed at the bottom. When the die member 51 is mounted in the holder the head and neck formation on the clutching handle registers with the socket so that said die member is temporarily attached to said clutching handle for retraction and propulsion upon proper rotation of said clutching handle.

In actual practice, taking into consideration only the die members 42 and 51 as above described, the clutching handle first is rotated counterclockwise until the stem 31 is fully withdrawn from the entrance 19, then the die member 42 is inserted in said entrance from the bottom of the holder until the base flanges 55 engage the side rails on both sides of said entrance. This will align the track ways 48 with the tracks 20 and said die member 42 then is moved along said tracks until the back face 44 abuts the outer end 17 of the die holder which will properly locate this die member relative to the punch 34. After the setting of the die member 42 as above described the clutching handle 28 is rotated clockwise until the head and neck formation on the terminal of the stem 31 is projected a short distance into the entrance 19 and then the die member 51 is inserted into said entrance in the same manner as the die member 42 but in this instance the socket 60 will register with the head and neck formation on the clutching handle stem and thereafter the proper rotation of said clutching handle will either propel or retract the second die member 51. To flare the end of a tube said second die member 51 is retracted and the tube positioned between the companion die members, either by inserting the tube into the pliers from the underside thereof or placing the pliers over the end of the tube until the tube is substatnially flush with the top faces of the die members. The clutching handle is then rotated clockwise until the die members are firmly clamped about the tube and any propelling action on the die member 51 will be transmitted directly or indirectly through the tube to the die member 42 so that all parts will be correctly aligned with the punch 34. Now by merely moving the handles towards one another the cam surfaces 41 will project the punch 34 into the end of the tube and expand the metal until it snugly fits the flared portion of the die recesses thus preventing any undue stretching of the metal to weaken the finished work. It is believed obvious that the die members must be assembled in proper order, with the inner faces opposed and the flared portions of the recesses at the top or facing the bridge span or bar 24.

While we have described the method of assembling the die members in the holder in a manner that said die members are inserted from the underside of said holder and that the construction of said die members provides that the base flanges be longer than the head flanges it should be apparent that the die members may be inserted from the top of the holder if the bridge span or bar 24 is spaced a sufficient distance from the holder proper to permit the die members to pass under the bridge and the base and head flanges may be of the same length, although this will require an operator to align the track ways with the tracks, or the head flanges may be the longer ones where the die members are insertable from the top. Also the T-slot socket would have to be reversed or run completely the full length of the die member 51 which is possible as will become apparent from the description below.

Further it is possible to employ two identical die members like that shown in Figs. 8, 9 and 10 since they can be reversed and the back face 53 of one die member 51 placed against the outer end 17 of the holder and the other die member 51 positioned to cause registration of its T-slot socket with the head and neck formation on the stem of the clutching handle.

Figure 11:
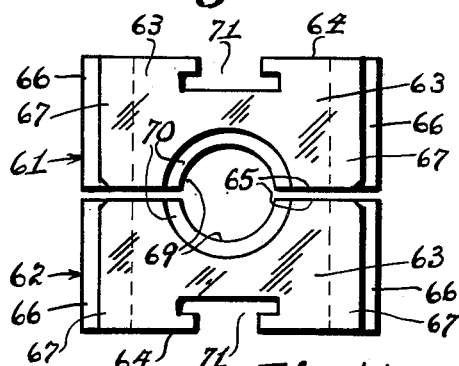
Fig. 11 is an upper or head end view of companion die members in operative relation and illustrating a slightly modified construction.
Figure 12:
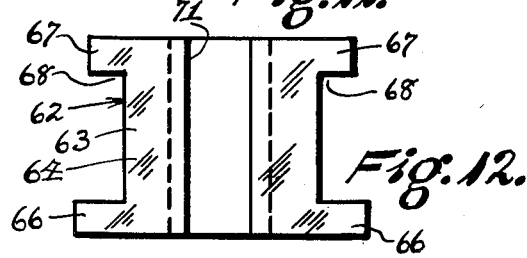
Fig. 12 is an outer face view thereof showing the T-slot socket as extending the full vertical length thereof.

To fully illustrate the reversibility of the die members there is shown in Figs. 11 and 12 a pair of cooperating or companion die members 61 and 62 identical in construction and each comprising a rectangular body 63 including a back or outer face 64 and a front or inner face 65 with oppositely outwardly projecting base flanges 66 at one end and similar oppositely outwardly projecting head flanges 67 at the opposite end, said base and head flanges on each side of the body being spaced apart on each side of the body being apart to form a track way 68 at said each side of the body for registration with the tracks 20 on the die holder as previously described. Said flanges may be of equal or different lengths and for purposes of illustration the base flanges are depicted as being longer than the head flanges.

The die members 61, 62 have complementary recesses or matrices 69 formed in the front or inner faces running from the bases to the heads of said die members and these recesses are flared outwardly at the upper or head ends as shown at 70 and each complete matrix is less than a semi-circle.

Each die member 61, 62 also has a T-slot socket 71 formed in the back face 64 thereof and running the full length of the die member body from top to bottom or from the head end to the base end.

The last described die members are assembled in the pliers and used the same as the others but particular attention is called to the construction which makes them reversible and capable of being assembled in any sequence.

It is to be understood that the die members are made in various sizes, that is the matrices in one pair of die members are fashioned to fit one size of tube, those in another pair are fashioned to fit a second or different size of tube and so on within the limits of the die member body areas, and the pairs of different sized die members are interchangeable wherefore only one pair of pliers is employed with a plurality of said pairs of die members.

Of course we do not wish to be limited to the exact details of construction herein shown and described as these may be varied within the scope of the appended claims without departing from the spirit of our invention.

Having described our invention what we claim as new and useful is:

1. Tube flaring pliers comprising an oblong die holder having closed ends and side rails, the latter provided with interior opposed parallel tracks extending from one of the holder ends towards the other holder end but terminating short of the latter, said tracks and the one end of the holder defining a chamber and the side rails and the other end of the holder defining an entrance of greater width than said chamber, a pair of clamping and forming die members adapted to be projected into the entrance and slid along the tracks for positioning said die members to clamp a tube to be flared, means including a clutching handle on the holder for propelling one of the die members into clamping position and retracting the same, a bridge on the holder, a punch located between said holder and bridge and slidably mounted on said bridge for reciprocation relative to the clamped die members, and an operating handle pivoted on the bridge and having cam portions engageable with the punch to propel the latter forwardly as said operating handle is moved towards the clutching handle.

2. The tube flaring pliers according to claim 1 wherein the means for propelling and retracting one of the die members includes, in addition to the handle, a journal rotatably and slidably mounted on the holder adjacent the entrance, a threaded body having threaded connection with the holder in an opening communicating with the entrance and a stem projecting into said entrance and having neck and head formation on the terminal of said stem for registration with a T-slot socket on the adjacent die member.

3. Tube flaring pliers comprising an oblong die holder having closed ends and side rails, the latter provided with interior opposed parallel tracks extending from one of the holder ends toward the other holder end but terminating short of the latter, said tracks and the one end of the holder defining a chamber and the side rails and the other end of the holder defining an entrance of greater width than said chamber, a pair of clamping and forming die members adapted to be projected into the entrance and slid along the tracks for positioning said die members to clamp a tube to be flared, means including a clutching handle on the holder for propelling one of the die members into clamping position and retracting the same, a bridge on the holder, a punch slidably mounted on said bridge for reciprocation relative to the clamped die members and retractible by spring, and an operating handle pivoted on the bridge and having cam portions engageable with the punch to propel the latter forwardly as said operating handle is moved towards the clutching handle, said operating handle being bifurcated at its pivoted end to provide legs straddling the bridge, each of said legs having a cam portion to engage the punch at opposite sides of said bridge.

4. The structure according to claim 3, in combination with a washer superimposed on the punch and lying between the latter and the cam portions of the operating handle.

5. Tube flaring pliers comprising an oblong die holder having closed ends and side rails, the latter provided with interior opposed parallel tracks extending from one of the holder ends toward the other holder end but terminating short of the latter, said tracks and the one end of the holder defining a chamber and the side rails and the other end of the holder defining an entrance of greater width than said chamber, a pair of clamping and forming die members adapted to be projected into the entrance and slid along the tracks for positioning said die members to clamp a tube to be flared, means including a clutching handle on the holder for propelling one of the die members into clamping position and retracting the same, a bridge on the holder, a punch slidably mounted on the bridge for reciprocation relative to the clamped die members, and an operating handle pivoted on the bridge and having cam portions engageable with the punch to propel the latter forwardly as said operating handle is moved towards the clutching handle, said operating handle being bifurcated at the pivoted end to provide legs straddling the bridge, each of said legs having a cam portion engageable with the punch at opposite sides of the bridge.

References Cited in the file of this patent

UNITED STATES PATENTS

| | | |
|---|---|---|
| 1,257,475 | Gapp | Feb. 26, 1918 |
| 1,350,904 | Walters | Aug. 24, 1920 |
| 1,799,474 | McChesney | Apr. 7, 1931 |
| 2,302,794 | Neukirch | Nov. 24, 1942 |
| 2,415,520 | Obecny | Feb. 11, 1947 |
| 2,505,665 | Franck | Apr. 25, 1950 |
| 2,643,563 | Gaudreau | June 30, 1953 |
| 2,662,575 | Wolcott | Dec. 15, 1953 |
| 2,671,339 | Krause | Mar. 9, 1954 |

FOREIGN PATENTS

| | | |
|---|---|---|
| 15,820 | Netherlands | Feb. 15, 1927 |